United States Patent
Saji et al.

(10) Patent No.: US 8,274,802 B2
(45) Date of Patent: Sep. 25, 2012

(54) ENERGY TRANSMISSION DEVICE AND SEMICONDUCTOR DEVICE FOR ENERGY TRANSMISSION CONTROL

(75) Inventors: Takashi Saji, Kadoma (JP); Tetsuji Yamashita, Kadoma (JP); Yoshihiro Mori, Kadoma (JP)

(73) Assignee: Panasonic Corporation, Osaka (JP)

( * ) Notice: Subject to any disclaimer, the term of this patent is extended or adjusted under 35 U.S.C. 154(b) by 579 days.

(21) Appl. No.: 12/535,211

(22) Filed: Aug. 4, 2009

(65) Prior Publication Data
US 2010/0085781 A1   Apr. 8, 2010

(30) Foreign Application Priority Data

Oct. 2, 2008   (JP) .................... 2008-256912

(51) Int. Cl.
*H02M 3/335* (2006.01)
(52) U.S. Cl. .................................................. 363/21.16
(58) Field of Classification Search ..... 363/21.12–21.18
See application file for complete search history.

(56) References Cited

U.S. PATENT DOCUMENTS

| | | | | |
|---|---|---|---|---|
| 6,256,210 | B1 | 7/2001 | Strijker et al. | 363/21.04 |
| 6,788,556 | B2* | 9/2004 | Hosotani et al. | 363/21.16 |
| 7,208,985 | B2 | 4/2007 | Yamashita | 327/108 |
| 7,889,521 | B2* | 2/2011 | Hsu | 363/21.14 |
| 7,911,814 | B2* | 3/2011 | Tao et al. | 363/21.12 |
| 2003/0048645 | A1* | 3/2003 | Hosotani et al. | 363/21.12 |
| 2003/0214251 | A1 | 11/2003 | Ichikawa et al. | 315/224 |
| 2005/0218942 | A1* | 10/2005 | Yamashita | 327/108 |

FOREIGN PATENT DOCUMENTS
JP   9-266256   10/1997
JP   2002-315333   10/2002

* cited by examiner

*Primary Examiner* — Jue Zhang
(74) *Attorney, Agent, or Firm* — Steptoe & Johnson LLP

(57) ABSTRACT

The present invention includes a voltage clamping circuit 6 for outputting a voltage signal, which has been clamped to a predetermined voltage, from the drain voltage of a switching element 1, and a turn-on detection circuit 7 for detecting the turn-on timing of the switching element 1 from the voltage signal. Thus it is possible to turn on the switching element 1 at the minimum value of the drain voltage without adding external terminals.

11 Claims, 10 Drawing Sheets

F I G. 2
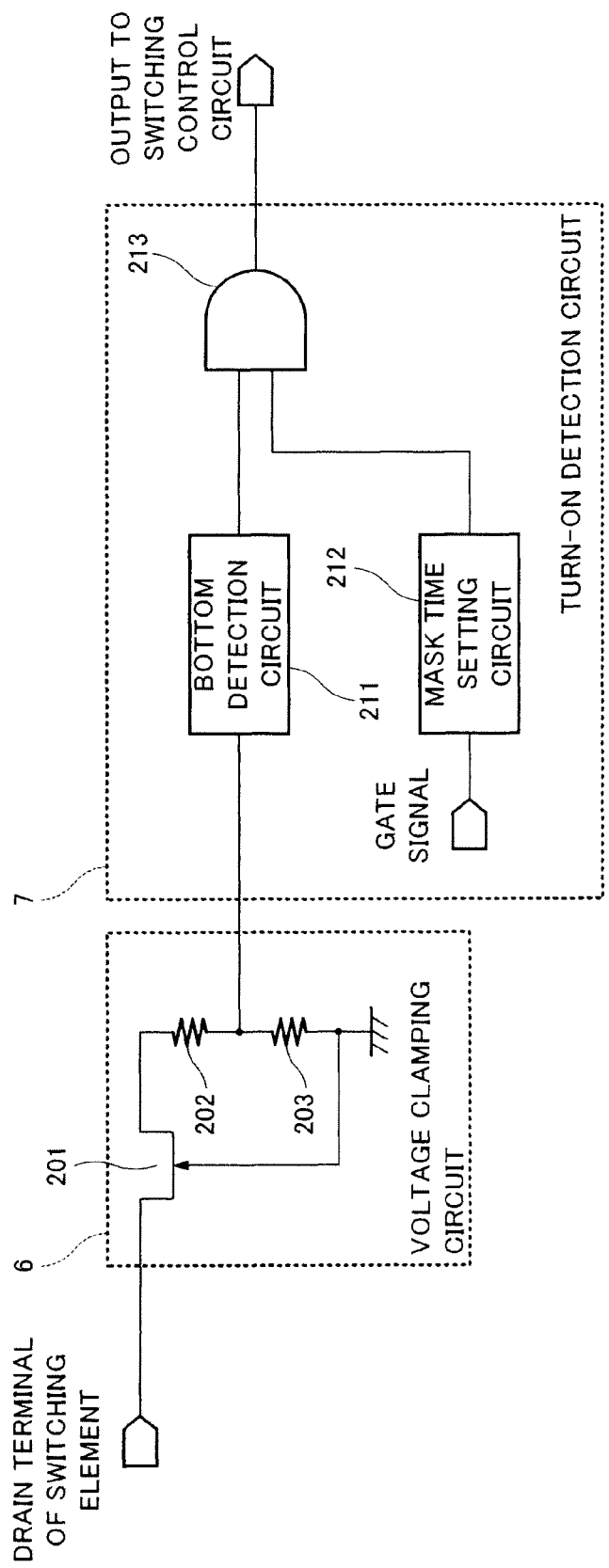

F I G. 3 A
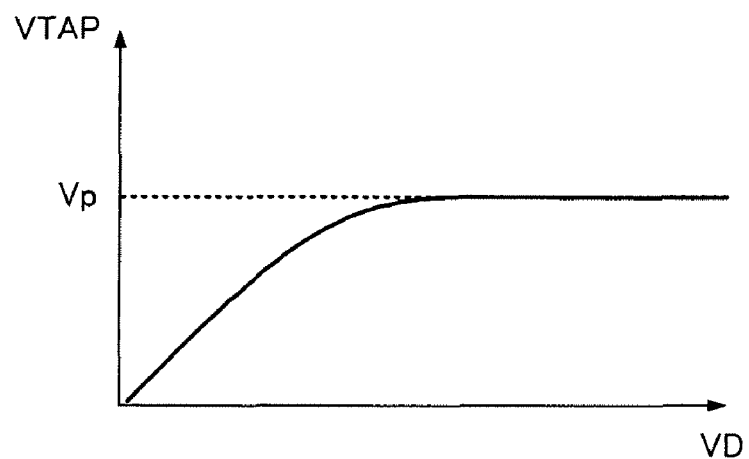
F I G. 3 B
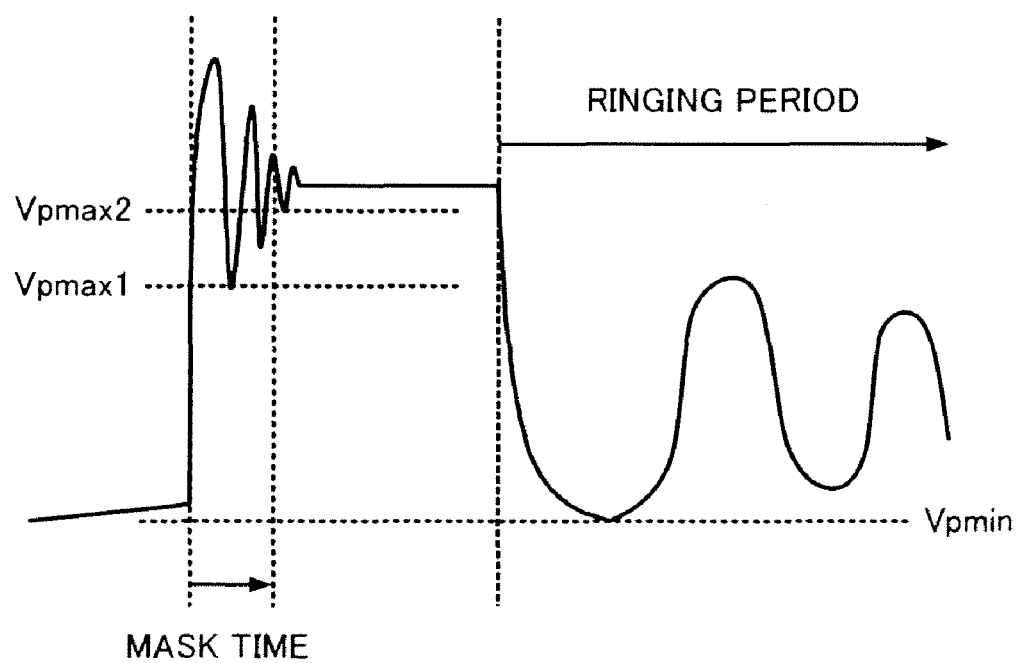

US 8,274,802 B2

ENERGY TRANSMISSION DEVICE AND SEMICONDUCTOR DEVICE FOR ENERGY TRANSMISSION CONTROL

FIELD OF THE INVENTION

The present invention relates to an energy transmission device for controlling an output voltage by switching an input voltage through a switching element, and a semiconductor device for energy transmission control which constitutes the energy transmission device.

BACKGROUND OF THE INVENTION

In the prior art, in order to improve power efficiency by reducing power consumption, switching power supplies including semiconductor devices for switching power supply control have been widely used as the power supplies of home appliances such as household electrical appliances. The semiconductor devices control output voltages by the switching operations of semiconductors (switching elements such as transistors).

However, switching power supplies generate high switching noise in response to switching operations for turning on/off switching elements, so that the switching power supplies acting as noise sources may cause problems such as a malfunction and a failure in other electronic equipment. Thus switching power supplies with reduced switching noise have been demanded.

Further, in order to increase power supply efficiency, switching power supplies with reduced switching loss have been also demanded.

In response to these demands, for example, a switching power supply is available which reduces switching noise and switching loss by using a ringing choke converter (RCC) pseudo-resonance control system for soft switching.

The switching power supply detects proper timing from a ringing voltage which is generated after a switching element is turned off and the passage of secondary current through the secondary winding of a transformer is stopped, and then the switching power supply turns on the switching element, so that soft switching is achieved.

A device for detecting turn-on timing is disclosed in, for example, Japanese Patent Laid-Open No. 2005-287260. In a switching power supply disclosed in this document, as shown in FIG. 9, a turn-on detection circuit 7 detects a time when a voltage induced to an auxiliary winding 110c of a transformer 110 is switched from a positive voltage to a negative voltage by the switching operation of a switching element 1, through resistors 143 and 144 connected to the auxiliary winding 110c. Thus the switching element 1 is controlled to be turned on when a voltage applied to the switching element 1 decreases.

Further, a device for detecting turn-on timing is disclosed in, for example, National Publication of International Patent Application No. 2003-524359. In a switching power supply disclosed in this document, as shown in FIG. 10, a switching element 1 is controlled to be turned on when the time derivative of a voltage applied to the switching element 1 is equal to a certain reference value not larger than 0 and the voltage applied to the switching element 1 is smaller than an input voltage, that is, the voltage applied to the switching element 1 reaches the minimum value as a result of a comparison made by a comparator circuit 9.

However, in the switching power supply of the prior art disclosed in Japanese Patent Laid-Open No. 2005-287260, the turn-on timing of the switching element is detected in a pseudo manner from the voltage induced to the auxiliary winding, so that the accuracy of detection is lower than the case where the voltage applied to the switching element is directly monitored. Since the switching element is turned on when the voltage reaches the minimum value, an adjustment has to be made by an external component such as a capacitor. Moreover, an external terminal to be connected to the auxiliary winding is necessary, thereby increasing the number of external components and the cost.

In the switching power supply of the prior art disclosed in National Publication of International Patent Application No. 2003-524359, the voltage applied to the switching element is directly monitored and thus the switching element can be more easily turned on at the minimum value as compared with the switching power supply disclosed in Japanese Patent Laid-Open No. 2005-287260. However, the circuit for detecting the turn-on timing of the switching element has to be resistant to a high voltage applied to the switching element.

Generally, a voltage applied to a switching element immediately after the turn-off of the switching element fluctuates due to the leakage inductance of a transformer, the parasitic capacitance of the switching element, and so on. Thus in the switching power supply disclosed in National Publication of International Patent Application No. 2003-524359, the switching element is controlled to be turned on only when the voltage applied to the switching element is lower than the input voltage, so that the turn-on timing of the switching element is not erroneously detected.

Thus in a semiconductor device for switching power supply control disclosed in National Publication of International Patent Application No. 2003-524359, a comparator connected to the switching element and an input line is provided, so that an external terminal to be connected to the input line is necessary. The comparator also has to be resistant to a high voltage. The comparator made up of a high-withstand voltage element increases a chip area and the number of manufacturing steps, resulting in higher cost.

DISCLOSURE OF THE INVENTION

The present invention has been devised to solve the problems of the prior art. An object of the present invention is to provide an energy transmission device and a semiconductor device for energy transmission control which can facilitate the design of a switching power supply and reduce the size and cost of the switching power supply by reducing the number of external terminals in the switching power supply for detecting a state of ringing voltage generated after the switching element is turned off and the passage of secondary current through a secondary winding is stopped, and then turning on the switching element.

In order to solve the problems, an energy transmission device of the present invention includes: a transformer having a primary winding and a secondary winding; a switching element connected in series with the primary winding to switch a first DC voltage inputted through the primary winding; a control circuit for controlling the switching of the switching element; and an output voltage generating section for converting to a second DC voltage an AC voltage generated on the secondary winding by the switching control of the control circuit, and supplying power to a load, wherein the control circuit includes: a voltage clamping device for outputting a voltage signal clamped to a clamping voltage when a voltage applied to the switching element is not lower than the clamping voltage, the clamping voltage being lower than the minimum point of the voltage applied to the switching element in a period during which a secondary current passes through the secondary winding after the switching element is turned off by the switching control of the control circuit; and a turn-on detection circuit for detecting, from the voltage signal obtained by the voltage clamping device, a specific voltage of ringing voltage generated after the passage of the secondary current is stopped, and controlling a signal for turning on the switching element.

Further, the turn-on detection circuit does not detect the specific voltage of the ringing voltage when the voltage applied to the switching element is not lower than the clamping voltage.

Moreover, the turn-on detection circuit sets a detection prohibition period during which the specific voltage of the ringing voltage is not detected, the detection prohibition period starting from the turn-off of the switching element and being completed at least before the passage of the secondary current is stopped.

Further, the voltage clamping device sets the clamping voltage lower than the minimum point of the voltage applied to the switching element in a period from when the detection prohibition period has elapsed to when the ringing voltage is generated.

Moreover, the voltage clamping device outputs a voltage signal clamped to a voltage lower than the withstand voltage of a circuit element constituting the turn-on detection circuit.

Further, the voltage clamping device sets the clamping voltage higher than a value at which the turn-on detection circuit detects the ringing voltage.

Moreover, the voltage clamping device has a junction field effect transistor which is fed with the voltage applied to the switching element, is pinched off at the clamping voltage, and outputs the voltage signal.

Further, the voltage clamping device outputs the voltage signal according to the voltage applied to the switching element, and when the voltage applied to the switching element is not lower than the clamping voltage, the voltage clamping device outputs the voltage signal after stepping down through a voltage divider circuit the voltage of the voltage signal having been clamped to the clamping voltage.

Moreover, the specific voltage is the minimum voltage of the ringing voltage.

Further, the turn-on detection circuit detects a period from when the switching element is turned off to when the passage of the secondary current is stopped, and controls the signal for turning on the switching element.

A semiconductor device for energy transmission control according to the present invention constitutes the energy transmission device, wherein the switching element and the control circuit are formed on the same substrate as a semiconductor IC.

As has been discussed, according to the present invention, a state of ringing voltage is detected from the voltage applied to the switching element in the switching power supply for detecting the state of ringing voltage generated after the switching element is turned off and the passage of the secondary current through the secondary winding is stopped, and turning on the switching element. Thus it is possible to reduce the external terminals.

Further, when the voltage applied to the switching element is not lower than a predetermined voltage, with the voltage clamping device for outputting the voltage signal which has been clamped to a predetermined voltage range, the turn-on timing is not erroneously detected even when the voltage applied to the switching element oscillates immediately after the switching element is turned off. Thus it is possible to omit a comparator connected to the switching element and an input line and reduce the number of external terminals for connection to the input line.

Moreover, the junction field effect transistor designed to be set at a proper pinch-off voltage is used for the voltage clamping device, so that the turn-on timing is not erroneously detected and the turn-on detection circuit can be easily made up of low-withstand voltage elements.

This configuration can substantially reduce the external terminals for detecting the turn-on timing, so that the switching power supply can be easily designed and the size and cost can be reduced.

BRIEF DESCRIPTION OF THE DRAWINGS

FIG. 2 is a circuit block diagram showing a structural example of a voltage clamping circuit and a turn-on detection circuit in the semiconductor device for energy transmission control according to the first embodiment;

FIG. 3A shows the input VD-output VTAP characteristics of a junction field effect transistor in the voltage clamping circuit of the semiconductor device for energy transmission control according to the first embodiment;

FIG. 3B is a waveform chart showing a voltage applied to a switching element and a reference for setting a pinch-off voltage Vp of the junction field effect transistor in the voltage clamping circuit of the semiconductor device for energy transmission control according to the first embodiment;

DESCRIPTION OF THE EMBODIMENTS

The following will specifically describe an energy transmission device and a semiconductor device for energy transmission control according to embodiments of the present invention with reference to the accompanying drawings.

(First Embodiment)

The following will describe an energy transmission device and a semiconductor device for energy transmission control according to a first embodiment of the present invention.

Figure 1:
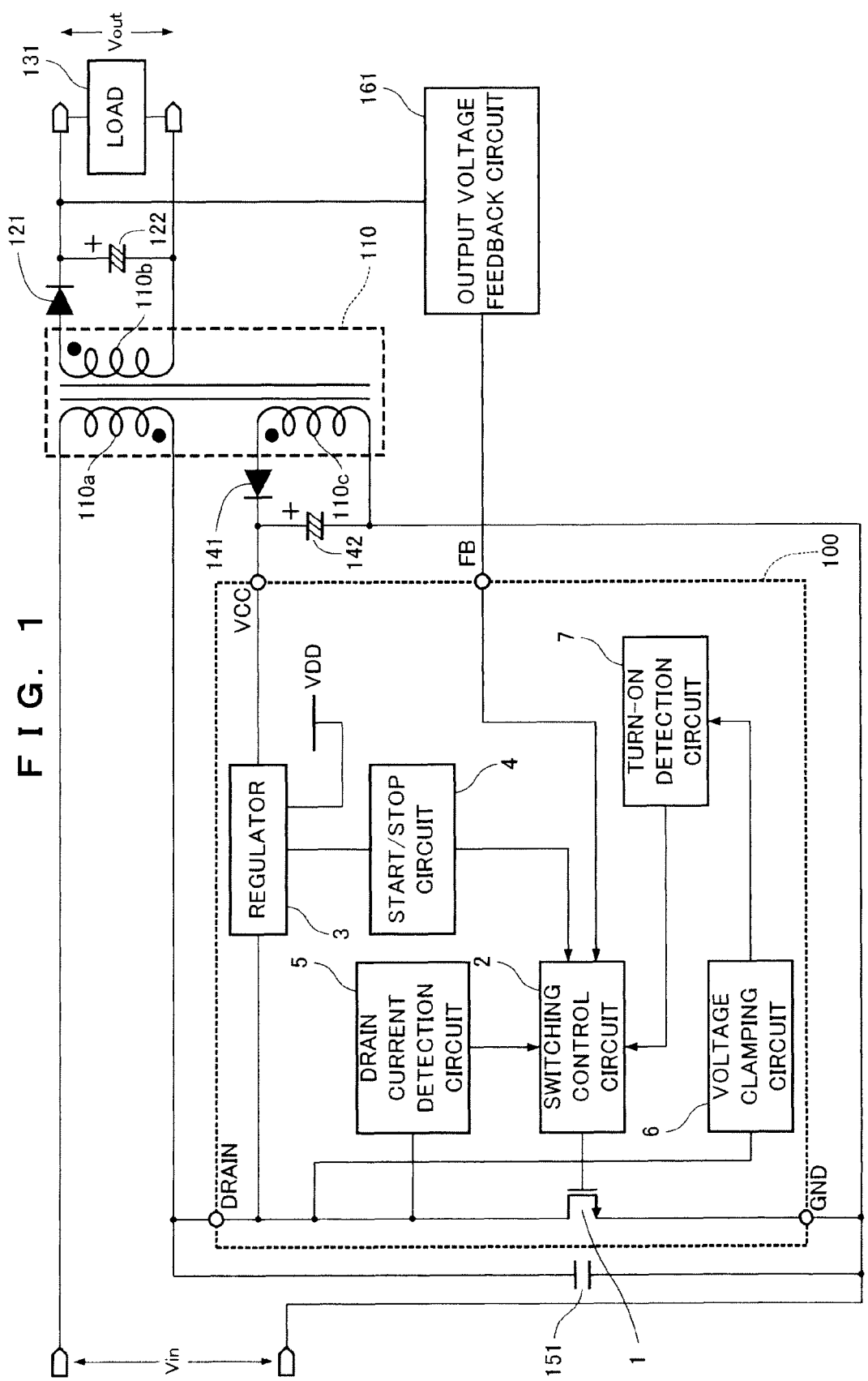
FIG. 1 is a circuit block diagram showing a first structural example of an energy transmission device including a semiconductor device for energy transmission control according to a first embodiment of the present invention.

FIG. 1 is a circuit block diagram showing a structural example of the energy transmission device including the semiconductor device for energy transmission control according to the first embodiment. In FIG. 1, a semiconductor device 100 for energy transmission control includes a switching element 1 made up of a power MOSFET and a switching control circuit 2 for controlling the switching operation of the switching element 1. Further, the semiconductor device 100 includes, as external connection terminals, four terminals of a high voltage input terminal (DRAIN terminal) for the switching element 1, an auxiliary power supply voltage input terminal (VCC terminal), a feedback input terminal (FB terminal), and a GND terminal for the semiconductor device 100 for energy transmission control, the GND terminal also acting as the output terminal (SOURCE) of the switching element 1.

A transformer 110 has a primary winding 110a, a secondary winding 110b, and an auxiliary winding 110c. The primary winding 110a and the secondary winding 110b are opposite in polarity. The energy transmission device, that is, the switching power supply is a flyback type power supply. The auxiliary winding 110c and the secondary winding 110b are of the same polarity. On the auxiliary winding 110c, an AC voltage (auxiliary-side AC voltage) proportionate to an AC voltage (secondary-side AC voltage) generated on the secondary winding 110b in response to the switching operation of the switching element 1 is generated.

The primary winding 110a is connected to the DRAIN terminal of the semiconductor device 100 for energy transmission control and the control electrode (gate) of the switching element 1 is controlled to be switched on/off in response to the output signal of the switching control circuit 2. With this configuration, switching control is performed on a first DC voltage (input voltage) Vin inputted to the switching element 1 through the primary winding 110a, and AC voltages are generated on the secondary winding 110b and the auxiliary winding 110c. The first DC voltage Vin is obtained by, for example, rectifying and smoothing commercial AC power.

To the secondary winding 110b, an output voltage generating section made up of a diode 121 and a capacitor 122 is connected. The output voltage generating section rectifies and smoothes the secondary-side AC voltage, which is generated on the secondary winding 110b in response to the switching operation of the switching element 1, into a second DC voltage (output voltage) Vout, and then the output voltage generating section outputs the voltage Vout to a load 131.

To the auxiliary winding 110c, a rectifying/smoothing circuit made up of a diode 141 and a capacitor 142 is connected. The rectifying/smoothing circuit rectifies and smoothes the auxiliary-side AC voltage, which is generated on the auxiliary winding 110c in response to the switching operation of the switching element 1, into an auxiliary power supply voltage VCC, and then the rectifying/smoothing circuit supplies the voltage VCC to the VCC terminal of the semiconductor device 100 for energy transmission control. The rectifying/smoothing circuit is used by a regulator 3, which will be described later, as an auxiliary power supply of the semiconductor device 100 for energy transmission control.

Between the DRAIN terminal and the GND terminal of the semiconductor device 100 for energy transmission control, a capacitor 151 is inserted to determine the scale and period of ringing caused by resonance with the transformer 110.

The FB terminal of the semiconductor device 100 for energy transmission control is fed with a feedback signal outputted from an output voltage feedback circuit 161 connected to the output voltage generating section, for example, a current signal from a phototransistor.

The following will describe a control circuit included in the semiconductor device 100 for energy transmission control. The control circuit includes the regulator 3 for controlling an internal circuit power supply voltage VDD, a start/stop circuit 4 for controlling the start and stop of the switching power supply, a drain current detection circuit 5 for detecting a drain current passing through the switching element 1, a voltage clamping circuit 6 for outputting a voltage signal clamped (limited) to a predetermined voltage range when at least a predetermined voltage is applied to the DRAIN terminal of the switching element 1, a turn-on detection circuit 7 for determining the turn-on timing of the switching element 1, and the switching control circuit 2 for outputting a signal for turning on/off the switching element 1 in response to the feedback signal and various control signals. The functions of the circuits will be described in turn.

The regulator 3 is connected to the DRAIN terminal of the switching element 1, the VCC terminal, the start/stop circuit 4, and the internal circuit power supply voltage VDD of the semiconductor device 100 for energy transmission control. When the input DC voltage Vin is applied to the DRAIN terminal of the switching element 1 through the transformer 110, the regulator 3 supplies a current from the DRAIN terminal through the VCC terminal to the capacitor 142 of the rectifying/smoothing circuit for outputting the auxiliary power supply voltage VCC, so that the auxiliary power supply voltage VCC is increased.

When a VCC terminal voltage reaches a starting voltage, the operation of the regulator 3 cuts off the current supply from the DRAIN terminal to the VCC terminal and current is supplied to the internal circuit by the capacitor 142 of the rectifying/smoothing circuit for outputting the auxiliary power supply voltage VCC. When the VCC terminal voltage decreases to a stop voltage, the operation of the regulator 3 supplies current from the DRAIN terminal to the VCC terminal as before the startup, so that the VCC terminal voltage increases again. In this way the internal circuit power supply voltage VDD is controlled to be kept constant by the regulator 3.

The start/stop circuit 4 monitors the VCC terminal voltage and controls the oscillation (on/off) and stop of the switching element 1 according to the magnitude of the VCC terminal voltage. When the VCC terminal voltage reaches the starting voltage, a starting signal is outputted to the switching control circuit 2. When the VCC terminal voltage decreases to the stop voltage, a stop signal is outputted to the switching control circuit 2.

The drain current detection circuit 5 acting as a switching element current detection circuit detects, for example, an on voltage determined by the product of the drain current passing through the switching element 1 and the on resistance of the switching element 1, so that the drain current detection circuit 5 relatively detects the drain current passing through the switching element 1. Further, the drain current detection circuit 5 outputs a voltage signal proportionate to the magnitude of the drain current to the switching control circuit 2.

The voltage clamping circuit 6 outputs a voltage signal according to the voltage applied to the DRAIN terminal. When the voltage applied to the DRAIN terminal is not lower than the predetermined voltage, the voltage signal clamped in the predetermined voltage range is outputted to the turn-on detection circuit 7. As shown in FIG. 2, the voltage clamping circuit 6 is made up of, for example, a junction field effect transistor 201 and a voltage divider circuit for dividing the output of the junction field effect transistor 201 with resistors 202 and 203. In this configuration, as shown in FIG. 3A, the junction field effect transistor 201 is desirably pinched off relative to a predetermined input voltage, has an output fixed at a predetermined voltage, and does not output a voltage signal higher than the predetermined voltage.

Further, the junction field effect transistor 201 has a pinch-off voltage Vp determined by the device structure and manufacturing conditions. The pinch-off voltage Vp can be set at any voltage during manufacturing. For example, the voltage Vp can be set at 50 V. In this case, the input voltage and the output voltage are both set at Vp when the junction field effect transistor 201 is pinched off. The input voltage and the output voltage may be different from each other.

Ideally the output is fixed at a constant value when the junction field effect transistor 201 is pinched off. The output may not be fixed at the constant value as long as the turn-on detection circuit 7 fed with the output signal does not erroneously detect the turn-on timing of the switching element 1.

The turn-on detection circuit 7 detects the turn-on timing of the switching element 1 from the voltage signal inputted from the voltage clamping circuit 6, and outputs a turn-on signal to the switching control circuit 2. As shown in FIG. 2, the turn-on detection circuit 7 is made up of, for example, a bottom detection circuit 211, a mask time setting circuit 212, and an AND circuit 213. The bottom detection circuit 211 has, for example, a differentiating circuit and detects the minimum of the voltage signal inputted from the voltage clamping circuit 6. The mask time setting circuit 212 outputs a mask time signal in a predetermined period after the switching element 1 is turned off. The outputs of the bottom detection circuit 211 and the mask time setting circuit 212 are inputted to the AND circuit 213 and the logical sum is outputted to the switching control circuit 2 as a turn-on detection signal.

The switching control circuit 2 outputs a signal for turning on/off the switching element 1 so as to stabilize the output DC voltage Vout at a constant value in response to the control signals inputted from the start/stop circuit 4, the drain current detection circuit 5, and the turn-on detection circuit 7 and the feedback signal inputted from the output voltage feedback circuit 161 through the FB terminal.

The following will describe the operations of the energy transmission device configured thus and the semiconductor device 100 for energy transmission control in FIGS. 1 and 2.

When AC power (not shown) is inputted to a rectifier such as a diode bridge from a commercial power supply, the power is rectified and smoothed into the DC voltage Vin by the rectifier and an input capacitor. The DC input voltage Vin is applied to the DRAIN terminal through the primary winding 110a of the transformer 110, and a startup charging current is applied from the DRAIN terminal through the regulator 3 to the capacitor 142 connected to the VCC terminal in the semiconductor device 100 for energy transmission control. When the charging current causes the VCC terminal voltage of the semiconductor device 100 for energy transmission control to reach the starting voltage set by the start/stop circuit 4, the control of the switching operation of the switching element 1 is started.

At startup, a startup pulse is generated (not shown in FIG. 1) based on the output signal from the start/stop circuit 4, and then the switching element 1 is turned on. When the switching element 1 is turned on, a current passes through the switching element 1 and a voltage corresponding to the magnitude of the current passing through the switching element 1 is inputted from the drain current detection circuit 5 to the switching control circuit 2. When the current passing through the switching element 1 reaches a set value determined by an overcurrent protection reference voltage VLIMIT, the current passing through the switching element 1 reaches a current value determined by the feedback signal from the output voltage feedback circuit 161, or a period during which the switching element 1 is turned on reaches the maximum on time set in the switching control circuit 2, the switching control circuit 2 turns off the switching element 1.

When the switching element 1 is turned off, energy accumulated on the primary winding 110a of the transformer 110 is transmitted to the secondary winding 110b at the turn-on of the switching element 1. After that, when a secondary-side current passing through the secondary winding 110b disappears, resonance is started which is determined by an inductance L of the primary winding 110a of the transformer 110 and a capacitance value C of the resonance capacitor 151 connected between the DRAIN terminal and the SOURCE terminal (GND terminal) of the switching element 1.

At this point, the turn-on detection circuit 7 generates the turn-on signal when the DRAIN terminal voltage of the switching element 1 reaches the minimum value, so that the switching element 1 is turned on again.

The output voltage Vout is increased by repeating the switching operation. When the output voltage Vout reaches at least the voltage set by the output voltage feedback circuit 161, the output voltage feedback circuit 161 performs control to pass a current as the feedback signal from, for example, the FB terminal of the semiconductor device 100 for energy transmission control. When the passed current increases, the switching control circuit 2 turns off the switching element 1 so as to limit the current passing through the switching element 1.

In this way the on duty (the ratio of an on period) of the switching element 1 changes to a proper state. In other words, the switching element 1 is turned on by the turn-on signal from the turn-on detection circuit 7, and the switching element 1 is turned off when the current passing through the switching element 1 reaches a current level determined by an amount of current flowing from the FB terminal.

In other words, at a light load with a small current applied to the load 131, the current passes through the switching element 1 for a short period. At a heavy load, the current passes through the switching element 1 for a long period.

In this way the semiconductor device 100 for energy transmission control controls the current passing through the switching element 1 according to power supplied to the load 131 of the switching power supply, and performs control so as to change the on duty. The turn-on timing of the switching element 1 is set so as to output the signal at the minimum DRAIN terminal voltage during resonance, thereby suppressing a switching loss and switching noise when the switching element 1 is turned on. Thus it is possible to increase the efficiency of the switching power supply and reduce noise.

Referring to FIGS. 2, 3A, and 3B, the voltage clamping circuit 6 and the turn-on detection circuit 7 will be specifically described below.

The voltage clamping circuit 6 of FIG. 2 is fed with the voltage applied to the DRAIN terminal. The voltage clamping circuit 6 steps down the voltage of the voltage signal, which has been clamped to a predetermined voltage, with the voltage divider circuit and outputs the voltage signal to the turn-on detection circuit 7. The turn-on detection circuit 7 detects the turn-on timing of the switching element 1 from the voltage signal inputted from the voltage clamping circuit 6, and outputs the turn-on signal to the switching control circuit 2.

Generally, when the voltage of a high voltage signal is stepped down, only a voltage divider circuit is used. As in the voltage clamping circuit 6 of FIG. 2, the junction field effect transistor 201 is inserted which is pinched off relative to the predetermined input voltage and outputs the voltage signal having been clamped to the predetermined voltage, thereby eliminating some or all of voltage oscillation components generated immediately after the switching element 1 is turned off. The voltage oscillation components generated immediately after the turn-off are caused by the leakage inductance of the transformer 110 and the parasitic capacitance of the switching element 1 and may result in erroneous detection of the turn-on timing. Thus it is desirable that the voltage oscillation components be eliminated as many as possible.

For example, when the voltage applied to the DRAIN terminal of the switching element 1 has a waveform of FIG. 3B, the junction field effect transistor 201 is designed such that the pinch-off voltage Vp of the junction field effect transistor 201 is Vp=Vpmax1 (the minimum point of the voltage oscillation immediately after the turn-off, for example, 30 V) or lower, so that all the voltage oscillation components can be eliminated immediately after the turn-off.

Ideally the output is fixed at a constant value when the junction field effect transistor 201 is pinched off. The turn-on detection circuit 7 fed with the output signal is desirably designed so as not to erroneously detect the turn-on timing of the switching element 1 even when the output is dependent upon input and some voltage oscillation components remain immediately after the turn-off.

As shown in FIG. 2, the turn-on detection circuit 7 may include the mask time setting circuit 212 for disabling the detection of the turn-on of the switching element 1 for a predetermined period after the switching element 1 is turned off. With this configuration, the pinch-off voltage can be increased to around Vpmax2 (e.g., 50 V) which is the minimum point of voltage oscillations in a period from when a mask time has elapsed until when ringing occurs due to the stop of the supply of the secondary-side current. Thus the junction field effect transistor 201 can be easily designed.

Since the turn-on timing of the switching element 1 is detected by the output signal from the voltage clamping circuit 6, the pinch-off voltage of the junction field effect transistor 201 has to be set larger than the minimum value (e.g., Vpmin in FIG. 3B) of ringing voltage generated by the stop of the supply of the secondary-side current.

The junction field effect transistor 201 may be fabricated in the same semiconductor substrate as the switching element 1 as disclosed in, for example, Japanese Patent Laid-Open No. 9-266256. Thus the chip size can be further reduced.

Moreover, the junction field effect transistor 201, the switching element 1, and the control circuit are formed on the same semiconductor substrate as an integrated circuit, thereby reducing the number of components constituting the switching power supply. Thus it is possible to easily reduce the size, weight, and cost.

Further, the output of the junction field effect transistor 201 may be further stepped down by the voltage divider circuit which divides the output with the resistors 202 and 203. Thus even when the junction field effect transistor 201 has a high pinch-off voltage, the turn-on detection circuit 7 can be made up of low-withstand voltage elements. Needless to say, the chip size and cost can be reduced.

Figure 7:
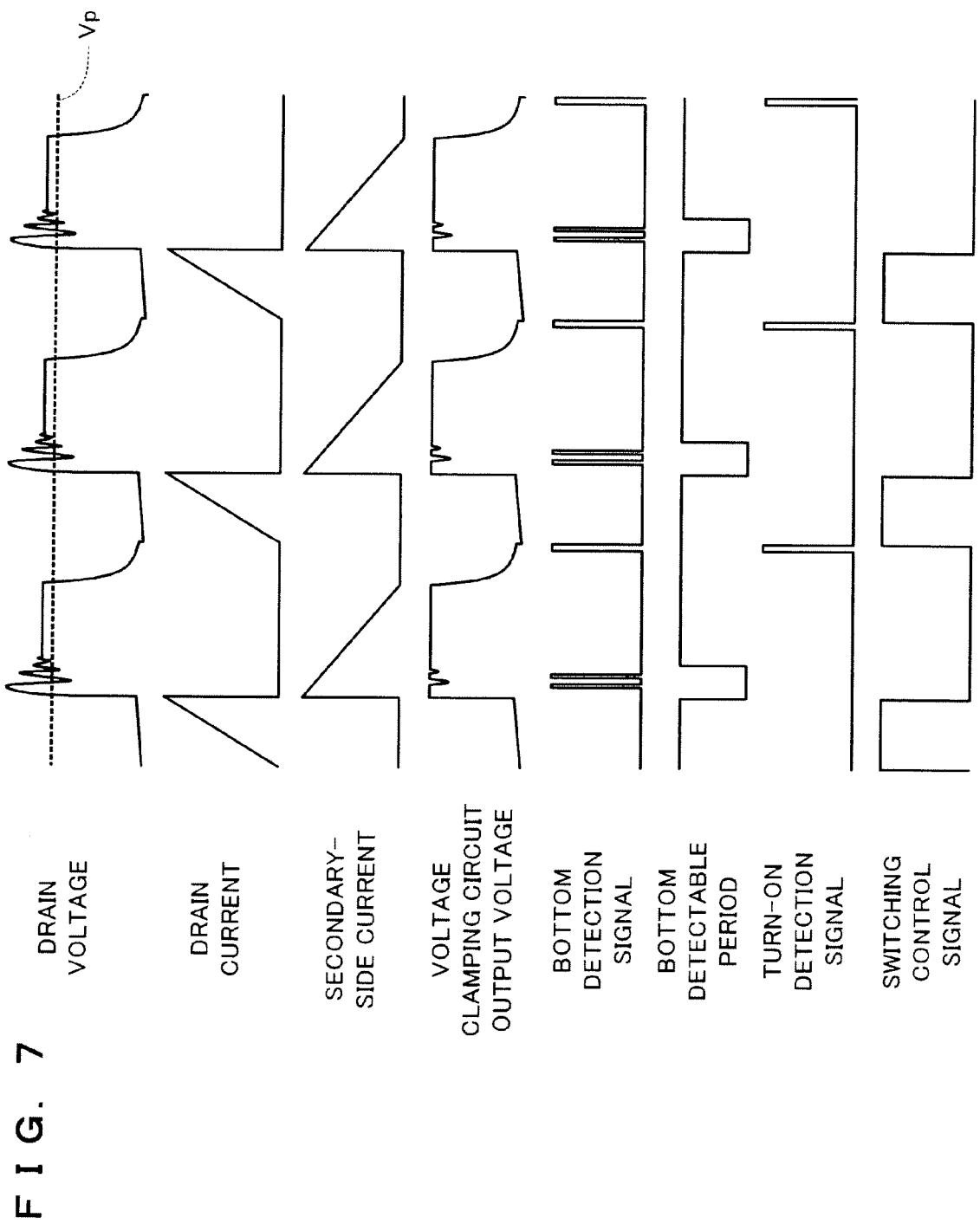
FIG. 7 is a timing chart showing the operations of the energy transmission device including the semiconductor device for energy transmission control according to the first embodiment.

Referring to the timing chart of FIG. 7, the following will discuss the representative operations of the energy transmission device including the semiconductor device for energy transmission control according to the first embodiment of the present invention.

When the voltage clamping circuit 6 includes the junction field effect transistor 201 having a pinch-off voltage set at Vp, a waveform obtained by clamping a portion where the drain voltage exceeds Vp is outputted as the output voltage of the voltage clamping circuit 6. The output signal is inputted to the turn-on detection circuit 7, a valley of the signal is detected by the differentiating circuit and the like, and the signal is processed as a bottom detection signal. In the meantime, the mask time setting circuit 212 prevents the reception of the bottom detection signal for a predetermined period after a gate signal (switching control signal) is turned off. After the predetermined period, when the bottom can be detected and the bottom detection signal is outputted, the turn-on detection signal is outputted from the AND circuit 213. Based on the turn-on detection signal, the gate signal (switching control signal) is outputted.

As has been discussed, according to the present embodiment, in the switching power supply which detects a state of the ringing voltage generated after the switching element is turned off and the passage of the secondary current through the secondary winding is stopped, and turns on the switching element 1, a state of the ringing voltage is detected from the voltage applied to the switching element 1, so that the number of external terminals can be reduced.

Figure 10:
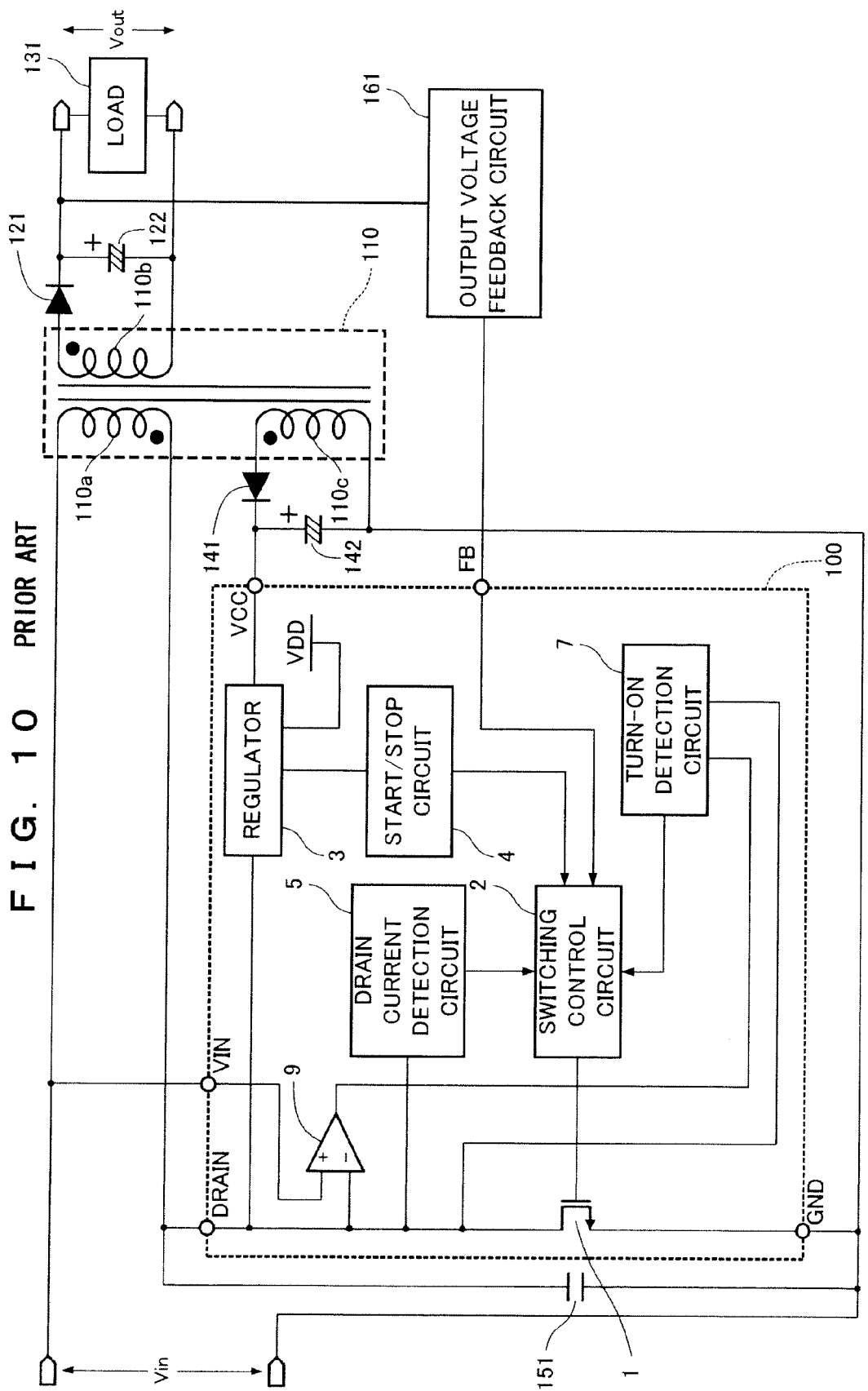
FIG. 10 is a circuit block diagram showing a structural example of an energy transmission device including a semiconductor device for energy transmission control according to the second prior art.

Further, with the voltage clamping circuit 6 for outputting the voltage signal which has been clamped to the predetermined voltage or more, the turn-on timing is not erroneously detected even when the voltage applied to the switching element 1 oscillates immediately after the switching element 1 is turned off. In other words, it is possible to omit the comparator circuit 9 connected to the switching element 1 and the input line in the second prior art (FIG. 10) and reduce the number of external terminals for connection to the input line.

Moreover, the voltage clamping circuit 6 allows the turn-on detection circuit 7 to be made up of low-withstand voltage elements, achieving a smaller chip size, lower cost, and an easier manufacturing process.

Figure 4:
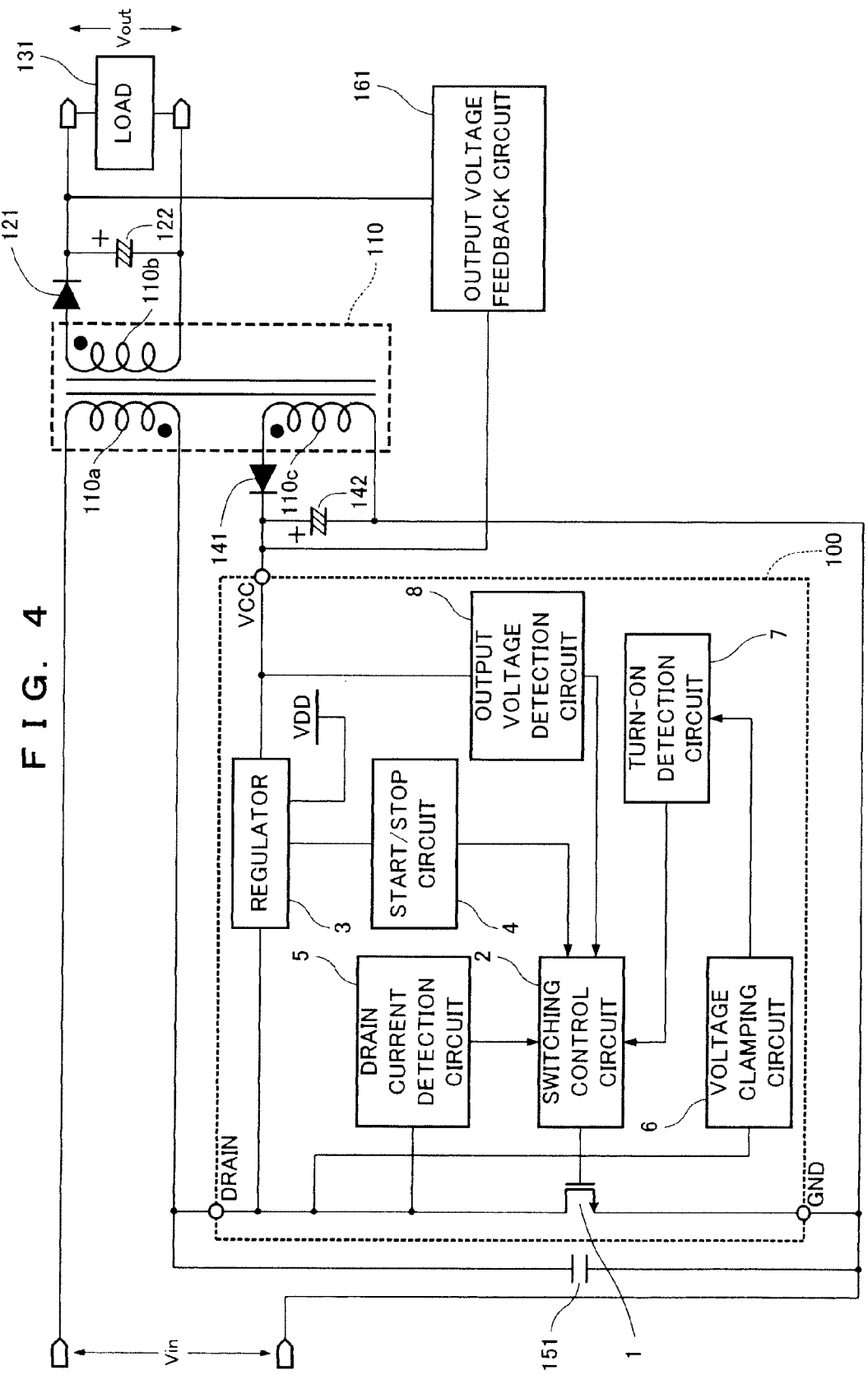
FIG. 4 is a circuit block diagram showing a second structural example of the energy transmission device including the semiconductor device for energy transmission control according to the first embodiment.

In the first embodiment, the semiconductor device 100 for energy transmission control includes the FB terminal and the feedback signal outputted from the output voltage feedback circuit 161 connected to the output voltage generating section is inputted to the FB terminal. As shown in FIG. 4, the feedback signal outputted from the output voltage feedback circuit 161 may be superimposed onto the VCC terminal voltage of the semiconductor device 100 for energy transmission control and feedback control may be performed by the output voltage detection circuit 8 connected to the VCC terminal voltage. Thus it is possible to reduce the number of FB terminals of the semiconductor device 100 for energy transmission control. For example, the external terminals of the semiconductor device 100 for energy transmission control may be only three terminals of the DRAIN terminal, the VCC terminal, and the GND terminal.

Figure 5:
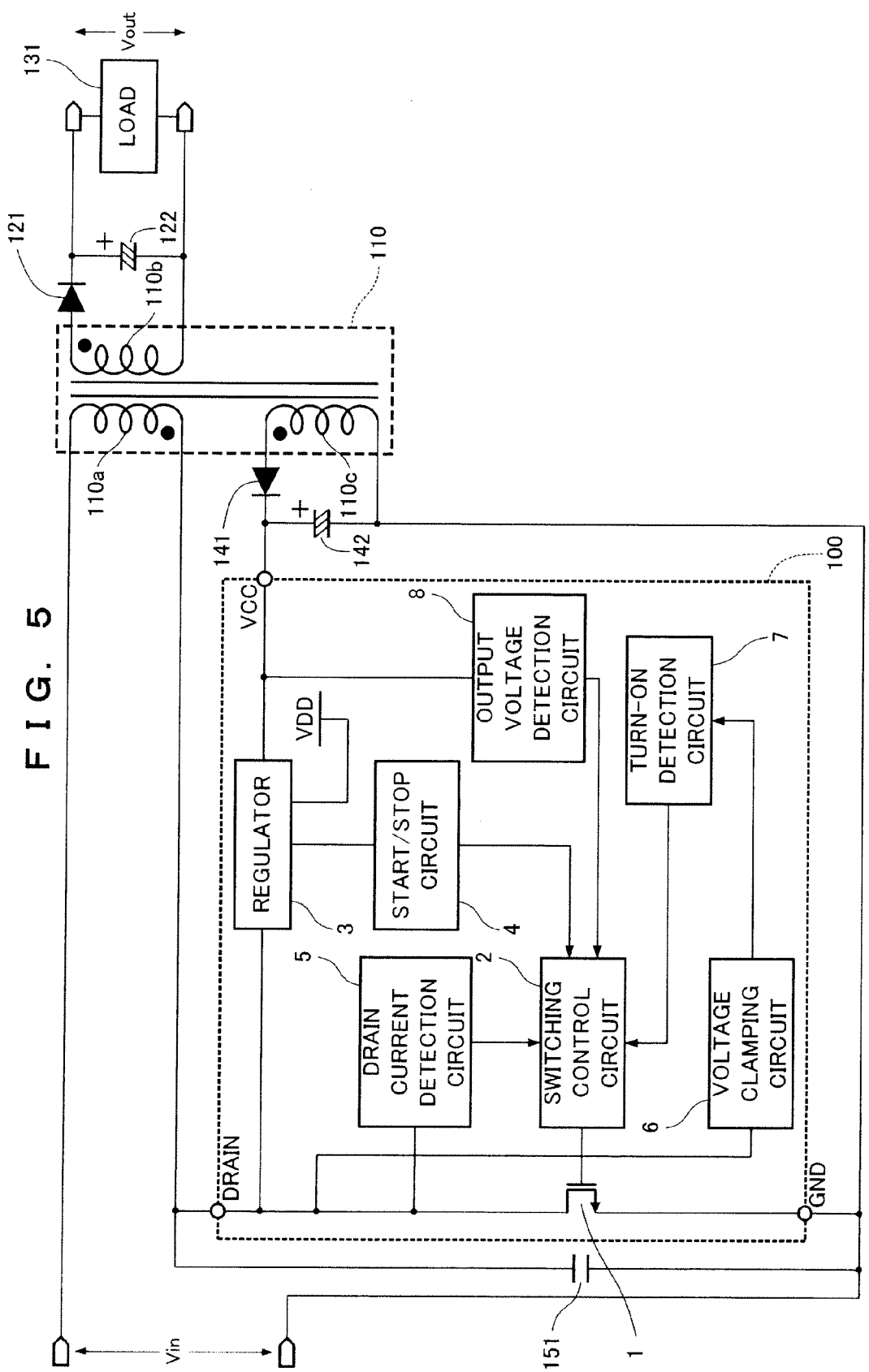
FIG. 5 is a circuit block diagram showing a third structural example of the energy transmission device including the semiconductor device for energy transmission control according to the first embodiment.

As shown in FIG. 5, the FB terminals of the semiconductor device 100 for energy transmission control may be reduced also by detecting the output voltage by using the auxiliary power supply voltage VCC proportionate to the output voltage Vout.

Figure 6:
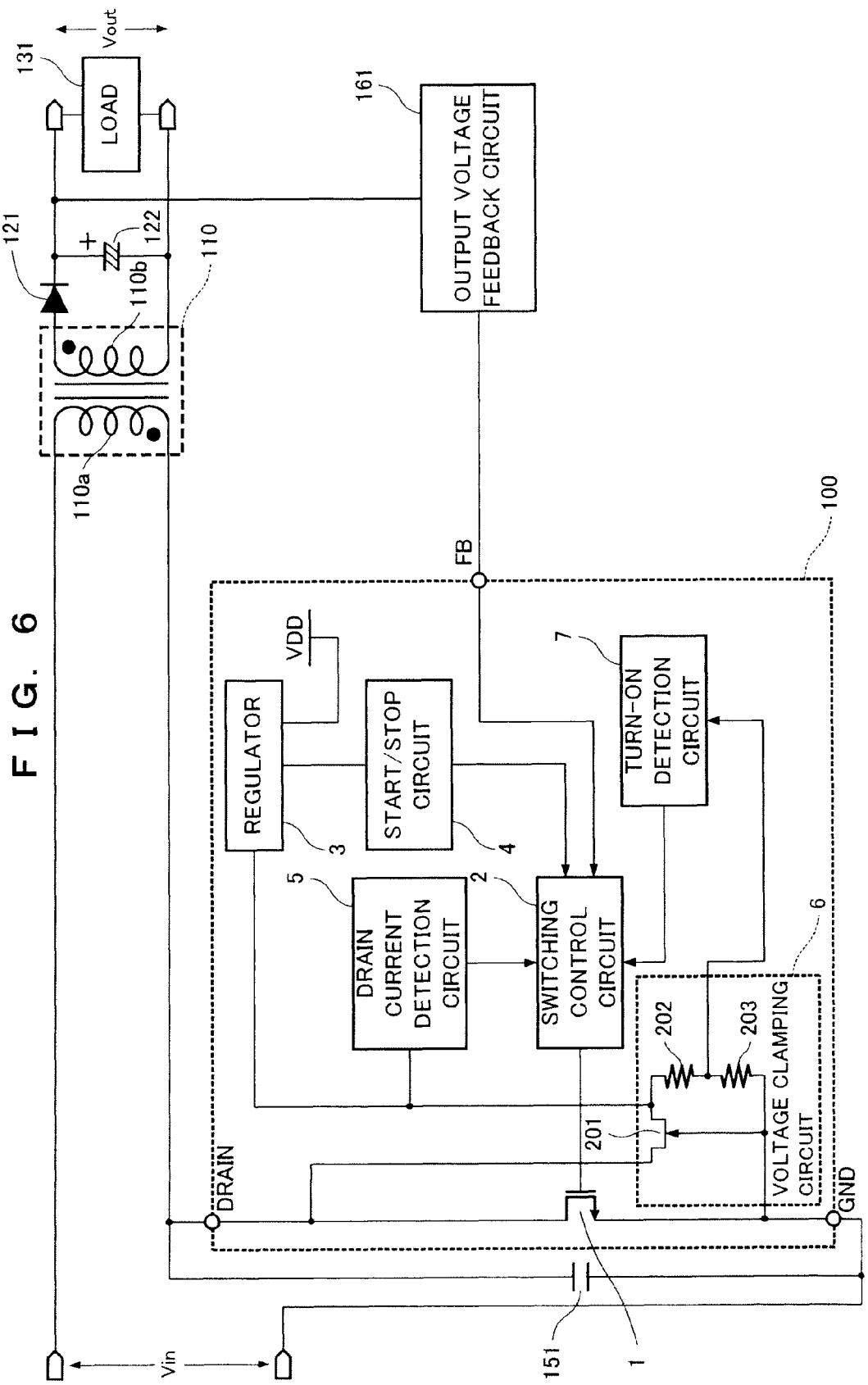
FIG. 6 is a circuit block diagram showing a fourth structural example of the energy transmission device including the semiconductor device for energy transmission control according to the first embodiment.

In the first embodiment, the regulator 3 and the drain current detection circuit 5 are connected to the DRAIN terminal of the switching element 1. As shown in FIG. 6, the output of the junction field effect transistor 201 having been fed with the DRAIN terminal voltage of the switching element 1 may be shared as an input signal to the regulator 3 and the drain current detection circuit 5. With this configuration, the regulator 3 and the drain current detection circuit 5 can be made up of low-withstand voltage elements, thereby reducing the chip size and cost. In this case, the pinch-off voltage of the junction field effect transistor 201 may be set in consideration of an input voltage necessary for the regulator 3.

In the first embodiment, the semiconductor device 100 for energy transmission control includes the VCC terminal connected to the auxiliary winding 110c. As shown in FIG. 6, power to be consumed by the semiconductor device 100 for energy transmission control is supplied only through the DRAIN terminal, so that it is possible to omit the auxiliary winding 110c, the rectifying/smoothing circuit connected to the auxiliary winding 110c, and the VCC terminal of the semiconductor device 100 for energy transmission control.

(Second Embodiment)

The following will describe an energy transmission device and a semiconductor device for energy transmission control according to a second embodiment of the present invention. The same members and circuit blocks as the first embodiment will be indicated by the same reference numerals and the explanation thereof is omitted.

Figure 8:
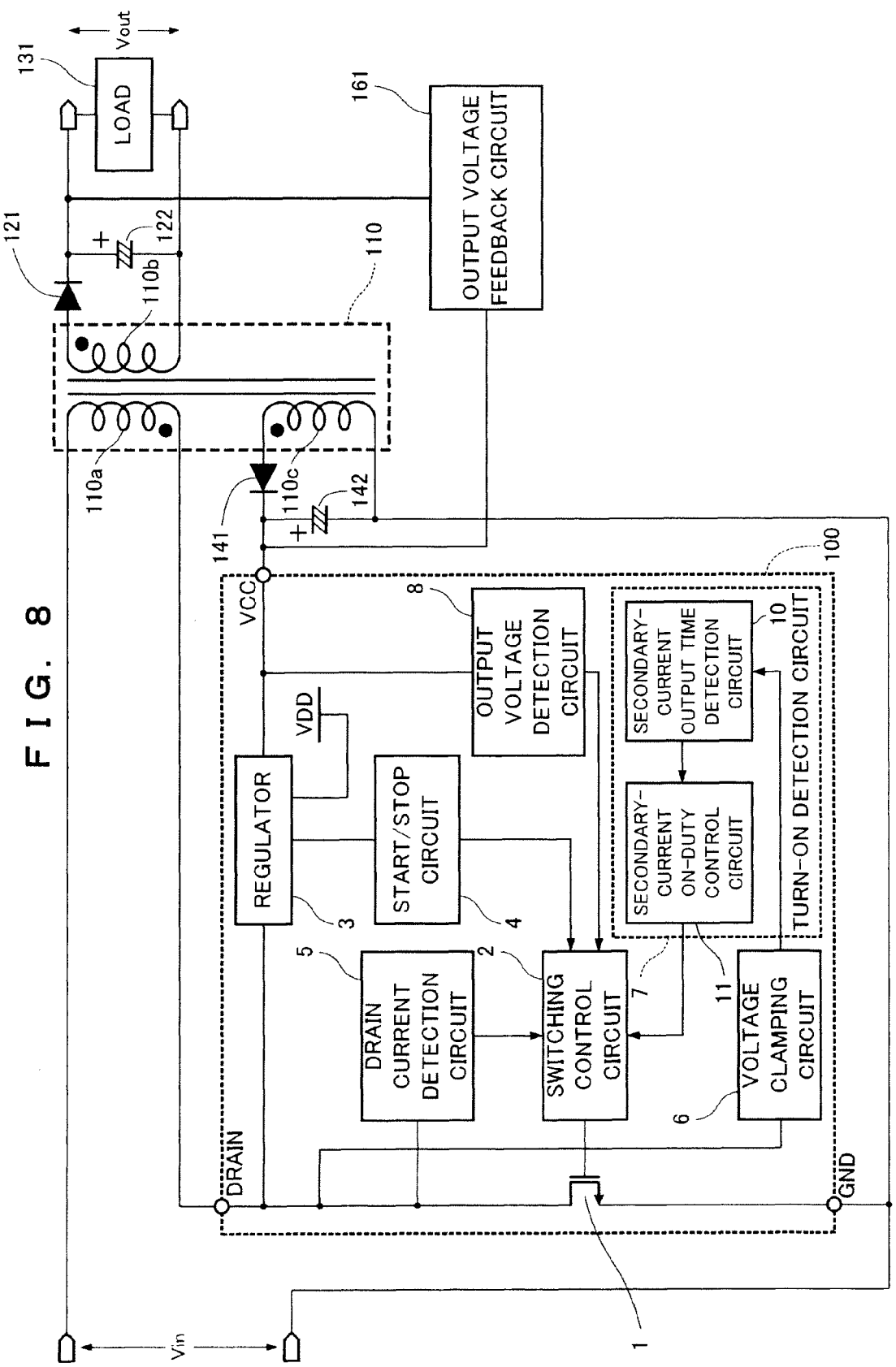
FIG. 8 is a circuit block diagram showing a structural example of an energy transmission device including a semiconductor device for energy transmission control according to a second embodiment of the present invention.
Figure 9:
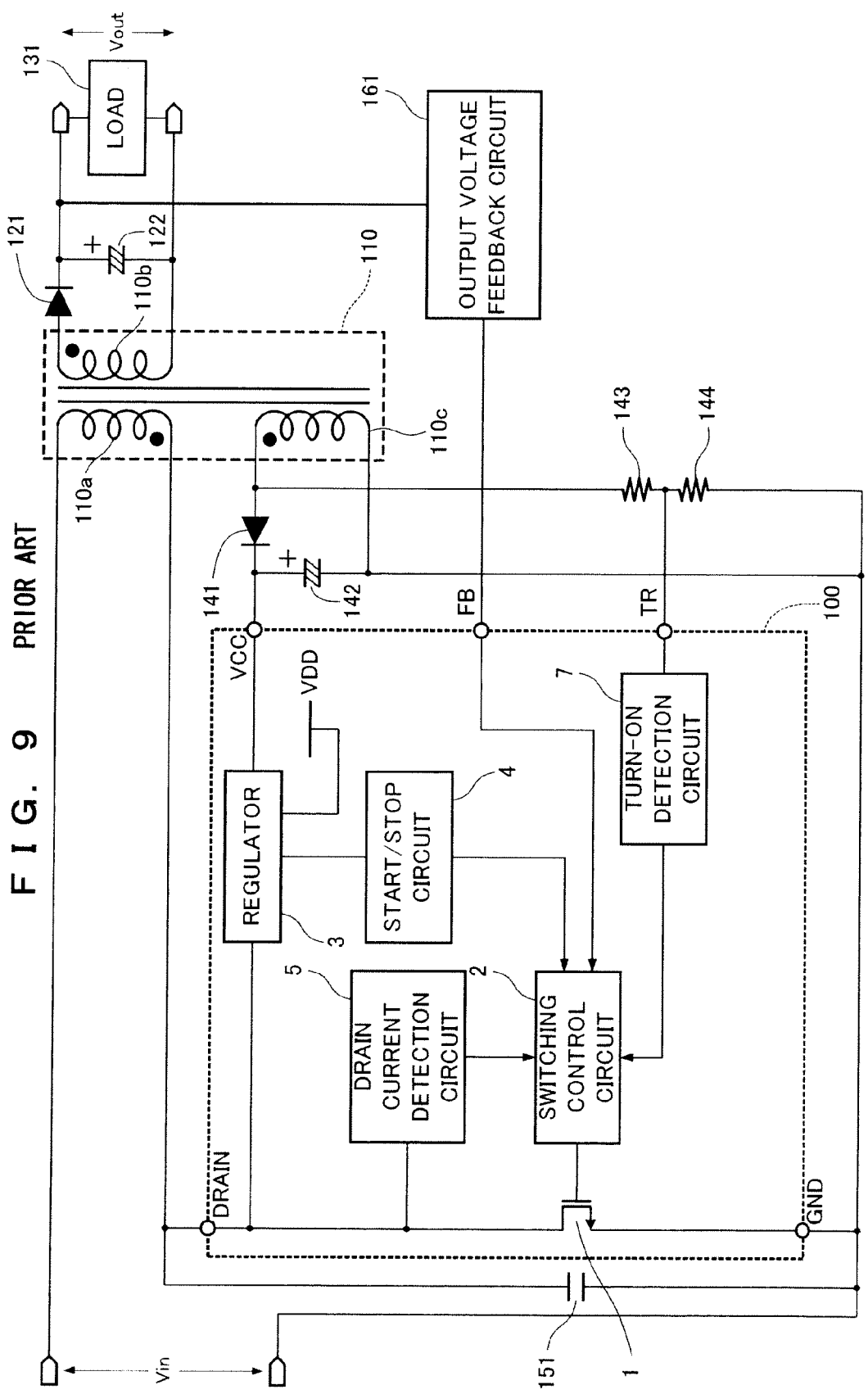
FIG. 9 is a circuit block diagram showing a structural example of an energy transmission device including a semiconductor device for energy transmission control according to the first prior art.

FIG. 8 is a circuit block diagram showing a structural example of the energy transmission device including the semiconductor device for energy transmission control according to the second embodiment. In the second embodiment, a turn-on detection circuit 7 includes a secondary-current output time detection circuit 10 and a secondary-current on-duty control circuit 11. Further, by using an auxiliary power supply voltage VCC proportionate to an output voltage Vout, the output voltage is detected by an output voltage detection circuit 8. In response to a signal inputted from the output voltage detection circuit 8, a switching control circuit 2 controls the switching of a switching element 1 so as to keep the output voltage Vout constant (constant voltage control).

The following will describe the constant current control function of a semiconductor device 100 for energy transmission control according to the second embodiment of the present invention. This function is realized by the secondary-current output time detection circuit 10 and the secondary-current on-duty control circuit 11. With this function, the oscillatory frequency of the switching element 1 is controlled so as to keep constant the on-duty ratio (the duty ratio of secondary current) of the on period of secondary current relative to a third period made up of a first period during which the secondary current flows (the on period of the secondary current) and a second period during which the secondary current does not flow (the off period of the secondary current), that is, relative to the oscillation period of the switching element 1, so that an output current can be controlled to be kept constant in a certain load range.

The secondary-current output time detection circuit 10 is connected to a voltage clamping circuit 6 to detect the off timing of the secondary current from a voltage signal outputted from the voltage clamping circuit 6. The secondary-current output time detection circuit 10 detects the on period of the secondary current (not shown in FIG. 8) by detecting, from the output signal of the switching control circuit 2, a time when the secondary current starts flowing (the on timing of the secondary current).

The following will describe the operations of the energy transmission device configured thus and the semiconductor device 100 for energy transmission control in FIG. 8.

In the switching power supply of the second embodiment, current passes through a primary winding 110a of a transformer 110 to accumulate energy in the transformer 110 during the on period of the switching element 1, and the energy accumulated in the transformer 110 is discharged to pass current (secondary current) through a secondary winding 110b of the transformer 110 during the off period of the switching element 1. After that, when the secondary current becomes zero, a resonance phenomenon occurs due to the inductance of the transformer 110 and the parasitic capacitance of the switching element 1. At this point, the voltage signal obtained through the voltage clamping circuit 6 from a voltage applied to the switching element 1 is inputted to the secondary-current output time detection circuit 10 to detect the off timing of the secondary current.

Since the secondary current starts flowing when the switching element 1 is turned off, the secondary-current output time detection circuit 10 detects a rising edge of the output signal of the switching control circuit 2 as the on timing of the secondary current.

The secondary-current on-duty control circuit 11 outputs a turn-on detection signal for turning on the switching element 1 such that the duty ratio of the secondary current (the on-duty of the secondary current) is kept at a predetermined value (constant value), based on a signal generated by the secondary-current output time detection circuit 10.

The turn-on detection signal determines the oscillatory (on/off) frequency of the switching element 1 in a constant current region. The frequency decreases with an increase in current passing through a load 131 and an increase in the on period of the secondary current.

In a load region where the on duty of the secondary current does not reach the constant value, the switching element 1 is controlled by PFM control and the like so as to keep the output voltage Vout constant, which will not be described in detail. In other words, constant voltage control and constant current control are selected according to the load 131 on the secondary side.

As has been discussed, according to the switching power supply of the second embodiment, a state of ringing voltage is detected from a voltage applied to the switching element 1. Thus it is possible to detect the on period of the secondary current without adding an external terminal to the semiconductor device 100 for energy transmission control, and obtain constant voltage characteristics and constant current characteristics without using an output voltage feedback circuit 161 using expensive components such as a photocoupler, thereby reducing the size, weight, and cost.

The first embodiment and the second embodiment mainly described the devices for detecting the turn-on timing of the switching element and described a reduction in the number of terminals of the semiconductor device in the energy transmission device and the semiconductor device for energy transmission control according to the present invention. Needless to say, other configurations of the energy transmission device and the semiconductor device for energy transmission control are included without departing from the scope of the present invention.

What is claimed is:

1. An energy transmission device, comprising:
 a transformer having a primary winding and a secondary winding;
 a switching element connected in series with the primary winding to switch a first DC voltage inputted through the primary winding;
 a control circuit for controlling switching of the switching element; and
 an output voltage generating section for converting to a second DC voltage an AC voltage generated on the secondary winding by switching control of the control circuit, and supplying power to a load,
 wherein the control circuit comprises:

a voltage clamping device for outputting a voltage signal clamped to a clamping voltage when a voltage applied to a DRAIN terminal of the switching element is not lower than the clamping voltage, the clamping voltage being lower than a minimum point of the voltage applied to the DRAIN terminal of the switching element in a period during which a secondary current passes through the secondary winding after the switching element is turned off by the switching control of the control circuit; and a turn-on detection circuit for detecting, from the voltage signal obtained by the voltage clamping device, a specific voltage of ringing voltage generated after passage of the secondary current is stopped, and controlling a signal for turning on the switching element.

2. The energy transmission device according to claim 1, wherein the turn-on detection circuit does not detect the specific voltage of the ringing voltage when the voltage applied to the switching element is not lower than the clamping voltage.

3. The energy transmission device according to claim 1, wherein the turn-on detection circuit sets a detection prohibition period during which the specific voltage of the ringing voltage is not detected, the detection prohibition period starting from turn-off of the switching element and being completed at least before the passage of the secondary current is stopped.

4. The energy transmission device according to claim 3, wherein the voltage clamping device sets the clamping voltage lower than the minimum point of the voltage applied to the switching element in a period from when the detection prohibition period has elapsed to when the ringing voltage is generated.

5. The energy transmission device according to claim 1, wherein the voltage clamping device outputs a voltage signal clamped to a voltage lower than a withstand voltage of a circuit element constituting the turn-on detection circuit.

6. The energy transmission device according to claim 1, wherein the voltage clamping device sets the clamping voltage higher than a value at which the turn-on detection circuit detects the ringing voltage.

7. The energy transmission device according to claim 1, wherein the voltage clamping device has a junction field effect transistor which is fed with the voltage applied to the switching element, is pinched off at the clamping voltage, and outputs the voltage signal.

8. The energy transmission device according to claim 1, wherein the voltage clamping device outputs the voltage signal according to the voltage applied to the switching element, and when the voltage applied to the switching element is not lower than the clamping voltage, the voltage clamping device outputs the voltage signal after stepping down through a voltage divider circuit a voltage of the voltage signal having been clamped to the clamping voltage.

9. The energy transmission device according to claim 1, wherein the specific voltage is a minimum voltage of the ringing voltage.

10. The energy transmission device according to claim 1, wherein the turn-on detection circuit detects a period from when the switching element is turned off to when the passage of the secondary current is stopped, and controls the signal for turning on the switching element.

11. A semiconductor device for energy transmission control constituting the energy transmission device according to claim 1, wherein the switching element and the control circuit are formed on a same substrate as a semiconductor IC.

* * * * *